United States Patent [19]

Farber et al.

[11] Patent Number: 4,977,966

[45] Date of Patent: Dec. 18, 1990

[54] SEAWATER HYDRAULIC ROTARY IMPACT TOOL

[75] Inventors: Bruce Farber, Oak View; John Kunsemiller; Scott Barradas, both of Oxnard, all of Calif.

[73] Assignee: The United States of America as represented by the Secretary of the Navy, Washington, D.C.

[21] Appl. No.: 502,594

[22] Filed: Mar. 30, 1990

[51] Int. Cl.[5] .................................... B23Q 5/00

[52] U.S. Cl. .................................... 173/159; 415/212.1

[58] Field of Search .................... 173/159, 163, DIG. 1, 173/73; 415/82, 112, 144, 212.1, 904

[56] References Cited

U.S. PATENT DOCUMENTS 3,468,385 9/1969 Penza .................................... 173/159

3,661,217 5/1972 Maurer .................................... 173/93.5

3,695,367 10/1972 Catterfeld et al. .................... 173/163

4,376,620 3/1983 Colston .................................... 418/79

4,526,239 7/1985 Kaneda et al. .......................... 173/73

4,558,539 12/1985 Hansson .................................... 51/170 R

*Primary Examiner*—Douglas D. Watts

*Assistant Examiner*—Willmon Fridie, Jr.

*Attorney, Agent, or Firm*—David S. Kalmbaugh

[57] ABSTRACT

This invention pertains to a rotary impact tool which utilizes pressurized seawater as the working fluid. When an operator engages a trigger on a novel control handle and valve assembly, pressurized seawater enters the rotary impact tool through the control handle and valve assembly and a reversing valve into a seawater powered vane motor. The shaft of the seawater powered motor, is coupled to a twin hammer impact mechanism by a novel coupling assembly with rotation of the vane motor driving the impact mechanism which translates vane motor power into impact torque. The impact mechanism is, in turn, sealed within a cavity in the front portion of the housing of rotary impact tool with lubrication and cooling of the impact mechanism being provided by a water soluble oil based lubricant which fills the cavity.

20 Claims, 5 Drawing Sheets

SEAWATER HYDRAULIC ROTARY IMPACT TOOL

BACKGROUND OF THE INVENTION

1. Field of the Invention

This invention relates generally to seawater powered tools. In particular, this invention relates to a rotary impact tool which utilizes pressurized seawater as the hydraulic operating fluid.

2. Description of the Prior Art

Conventional underwater tools are underwater pneumatic tools, underwater oil hydraulic tools and underwater electric tools which respectively utilize pressurized air, pressurized oil and electric power for motive power. Such conventional underwater tools have certain disadvantages.

In the underwater pneumatic tools, the air is usually exhausted into the surrounding water so that the depth at which the underwater pneumatic tool can be used is limited due to back pressure on the discharged air. Moreover, large quantities of bubbles are generated so that visibility in the water is disturbed and in some cases, the use of acoustic communication through the water is disturbed.

The use of oil driven hydraulic tools underwater creates serious logistics problems in that large quantities of oil have to be shipped and stored at sea. There is also a need for supply and return hoses from a surface ship limiting the diver's ability to handle the hydraulic tool, particularly where heavy surge and strong currents exist. Further, leakage of the oil fluid from the tool would contaminate the environment.

In underwater electric tools, electrical leakage into the water can occur so that it is dangerous for the diver to operate the tool underwater.

Another alternative would be to design a hydraulic tool which utilizes pressurized seawater as the operating fluid. The design of a tool which utilizes seawater as the hydraulic fluid presents a serious challenge to the designer because of the general corrosiveness of seawater on precision made parts in such tools. The poor lubricity of seawater and much lower viscosity for seawater than for conventional oil hydraulic fluid contributes to the problem of designing an efficient seawater operated hydraulic tool.

With the disadvantages inherent in the design of oil operated tools, air operated tools and electrically powered tools when utilized in an underwater environment the present invention was conceived and one of its objectives is to provide a rotary impact tool for use in an underwater environment, which utilizes seawater as the operating fluid and provides satisfactory results for the user.

It is another object of the present invention to provide a rotary impact tool which utilizes seawater as the hydraulic fluid so as not to contaminate the environment.

Various other advantages and objectives of the present invention will become apparent to those skilled in the art as a more detailed description of the invention is set forth below.

SUMMARY OF THE INVENTION

The aforesaid and other objects of the invention are accomplished by a rotary impact tool which utilizes pressurized seawater as the working fluid. When an operator engages a trigger on a novel control handle and valve assembly, pressurized seawater enters the rotary impact tool through the control handle and valve assembly and a reversing valve into a seawater powered vane motor. The shaft of the seawater powered vane motor, is coupled to a twin hammer impact mechanism by a novel coupling assembly with rotation of the vane motor driving the impact mechanism which translates vane motor power into impact torque. The impact mechanism is, in turn, sealed within a cavity in the front portion of the housing of rotary impact tool with lubrication and cooling of the impact mechanism being provided by a water soluble oil based lubricant which fills the cavity.

DESCRIPTION OF THE PREFERRED EMBODIMENT

Figure 1:
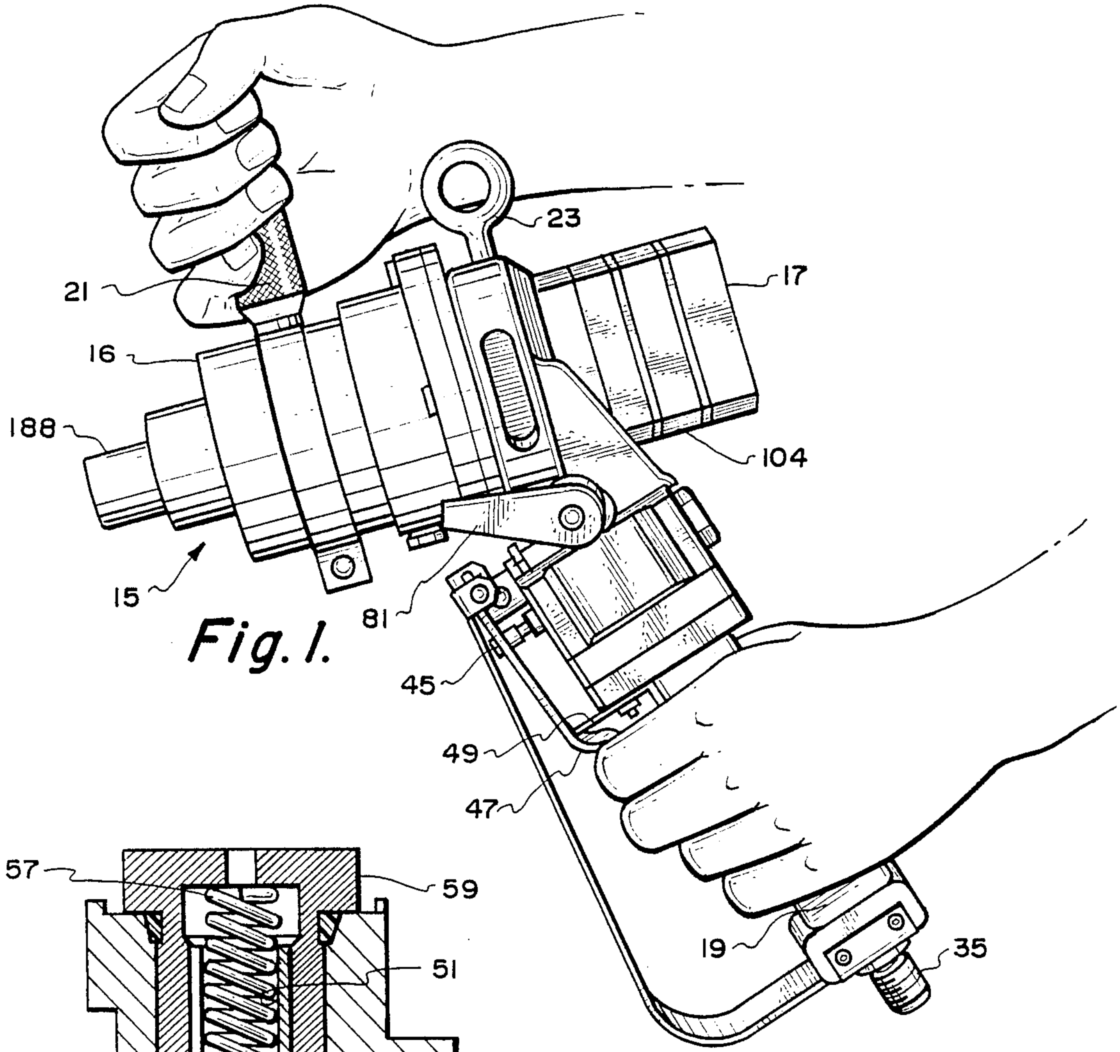
FIG. 1 is a perspective view of the preferred embodiment of the rotary impact tool constituting the present invention.

The preferred embodiment of the seawater hydraulic rotary impact tool constituting the present invention will now be discussed in some detail in conjunction with the figures of the drawing.

Referring first to FIG. 1, there is shown a perspective view of a seawater hydraulic rotary impact tool 15 comprising a frame or housing 16 having mounted thereon a seawater powered vane motor 17, a control handle and valve assembly 19, an auxiliary handle 21 which is adjustable for left or right handed operators, and a lifting eye 23.

At this time it should be noted that vane motor 17 is a reversible vane type 3.5 horsepower hydraulic motor which is operable with seawater as the hydraulic fluid and is described in U.S. Pat. No. 4,376,620, issued Sept. 8, 1983 to John R. Colston.

Figure 3:
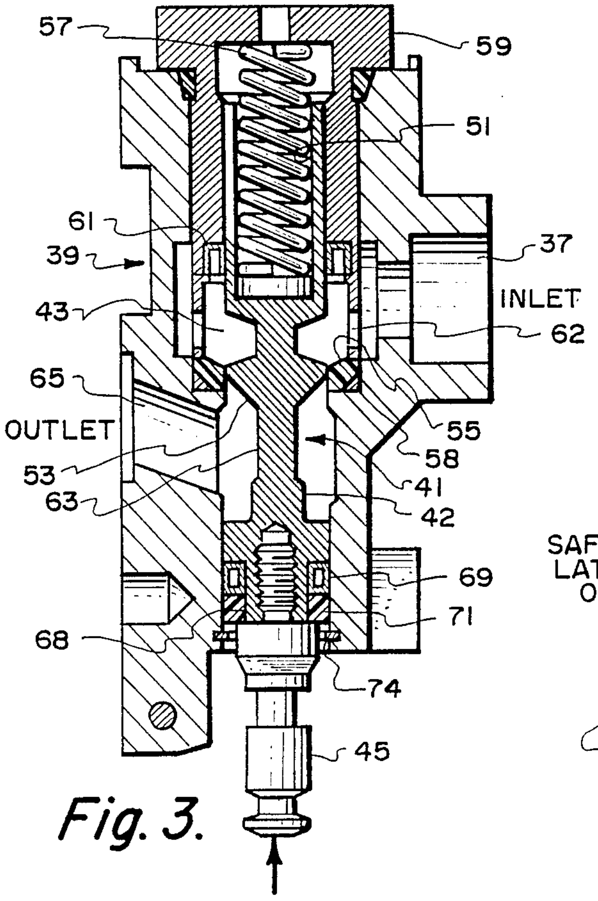
FIG. 3 is a view in section illustrating the valve assembly of the valve and handle assembly of the present invention.
Figure 4:
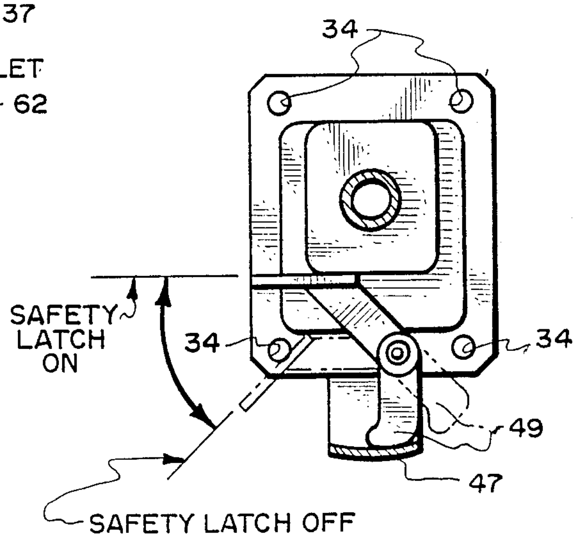
FIG. 4 is a front view illustrating the trigger safety latch of the valve and handle assembly.
Figure 2:
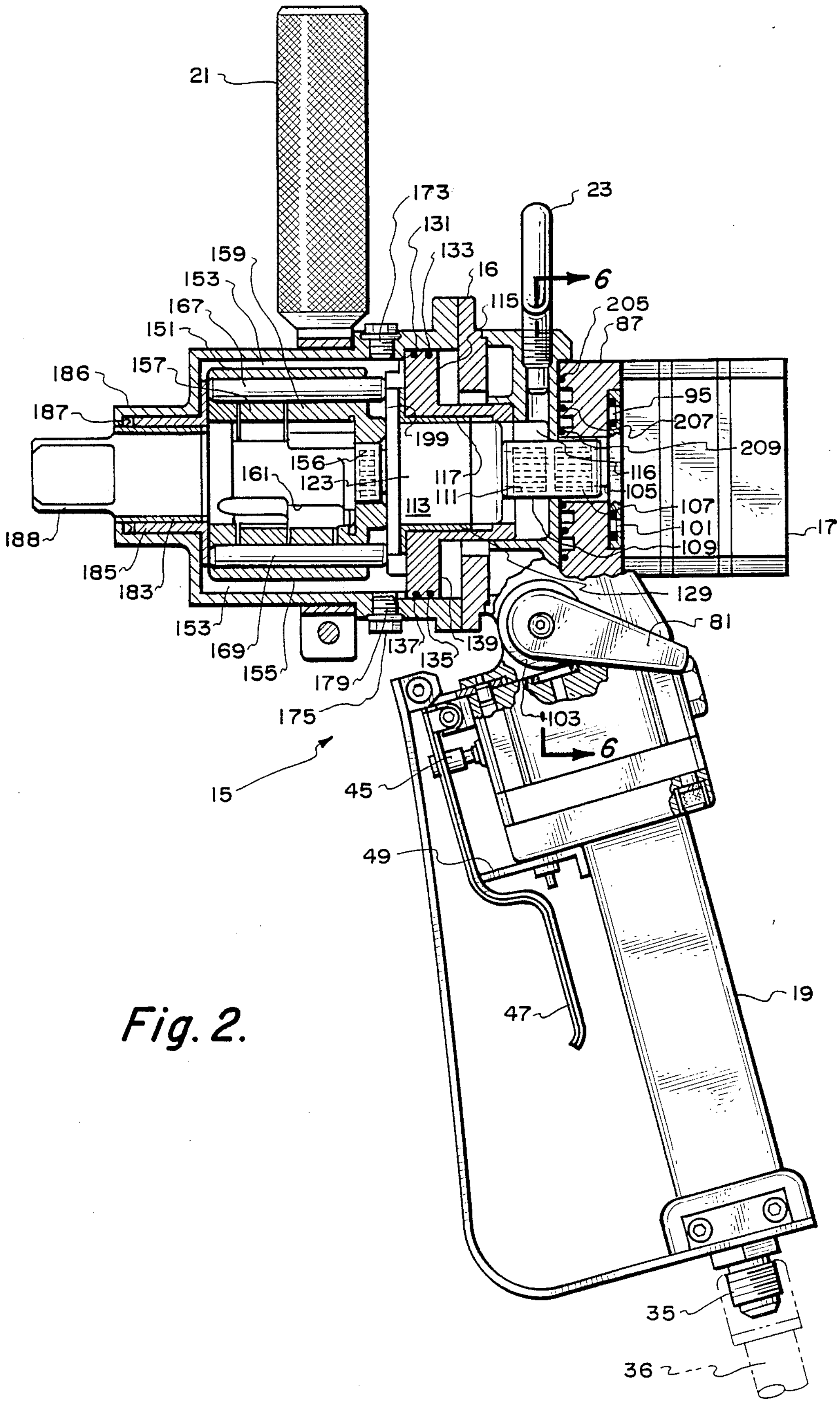
FIG. 2 is a side view in section illustrating the rotary impact tool constituting the present invention.

Referring now to FIGS. 2, and 3 pressurized seawater to drive motor 17 is provided by a source, not shown, through a threaded inlet 35 connected to a supply hose 36, illustrated in phantom, and a passageway 37 to the inlet side of a valve assembly 39 within control handle assembly 19. Control handle assembly 19 is attached to housing 16 by bolts 34, while valve assembly 39 includes a valve 41 which has a stem 42 that is slidingly fitted in a cavity 43 within control handle assembly 19. There is attached to the front end of stem 42 a trigger pin 45 which is, in turn, connected to a trigger 47 rotatably affixed to control handle assembly 19, and which has a trigger safety latch 49, FIG. 4, to prevent the accidental engagement of trigger 47.

Stem 42 also has a cavity 51 at its rear end, and a conical shaped face 53 near its center which is held against a valve seat 55 by a spring 57. Positioned on the underside of valve seat 55 within cavity 43 is an O ring 58 which allows movement of seat 55 with respect to conical shaped face 53, thereby assuring that conical shaped face 53 will seal against valve seat 55. Spring 57 has one end mounted within cavity 51 and the opposite end abutting a spring cap 59 mounted within the rear portion of cavity 43. A seal 61 positioned between the inner surface of spring cap 59 and stem 42 prevents leakage of pressurized seawater into cavity 51.

Adjacent conical shaped face 53 is an indent 63 in stem 42 which provides a fluid flow path between the inlet and outlet sides of a valve assembly 39. When an operator releases safety latch 49 and then engages trigger 47 which releases conical shaped face 53 from valve seat 55, pressurized seawater will flow from passageway 37 through an opening 62 in spring cap 59 and through indent 63 to a passageway 65 which connects the outlet side of valve assembly 39 to a reversing valve 67, FIG. 5.

There is mounted around an indent 68 near the front end of stem 42 a seal 69 which is secured by a retaining sleeve 71 and which prevents leakage of pressurized seawater from cavity 43. A retaining ring 74 is utilized to secure the stem 42 of valve 41 within cavity 43.

At this time it should be noted that the critical components of valve assembly 39, valve stem 42 and valve seat 55 were fabricated from materials resistant to the corrosive effects of seawater. Specifically, valve stem 42 was fabricated from stainless steel and valve seat 55 was fabricated from Torlon, a polymer manufactured by Amoco Chemical Corporation.

Figure 5:
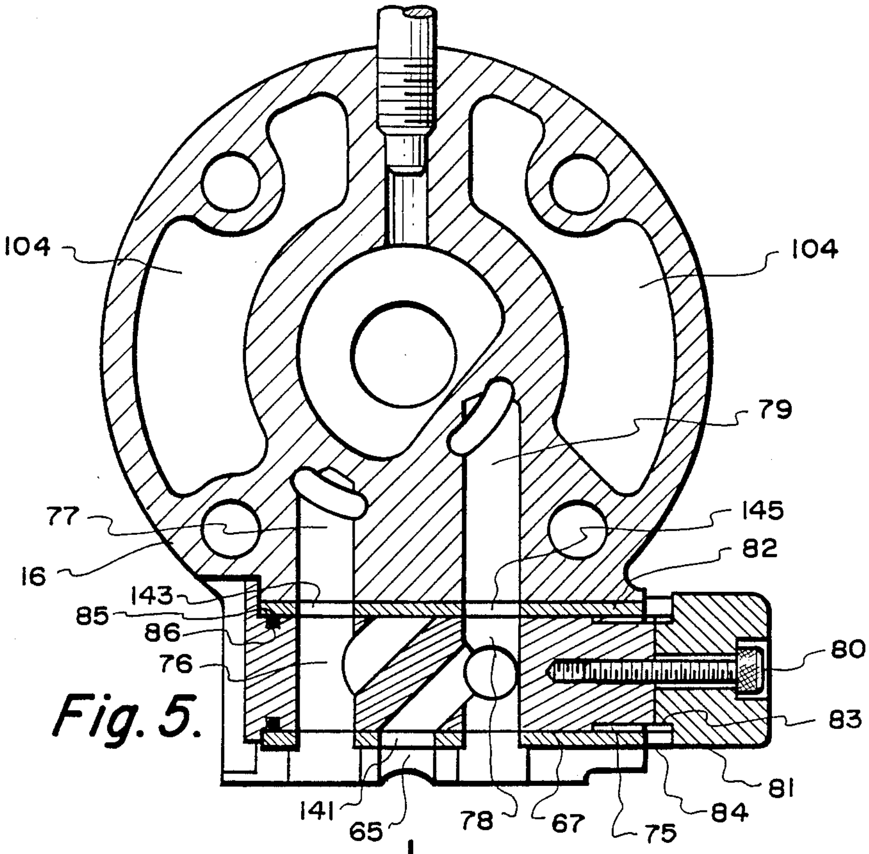
FIG. 5 is a sectional view of the reversing valve of the present invention taken along line 5—5 of FIG. 2.
Figure 6:
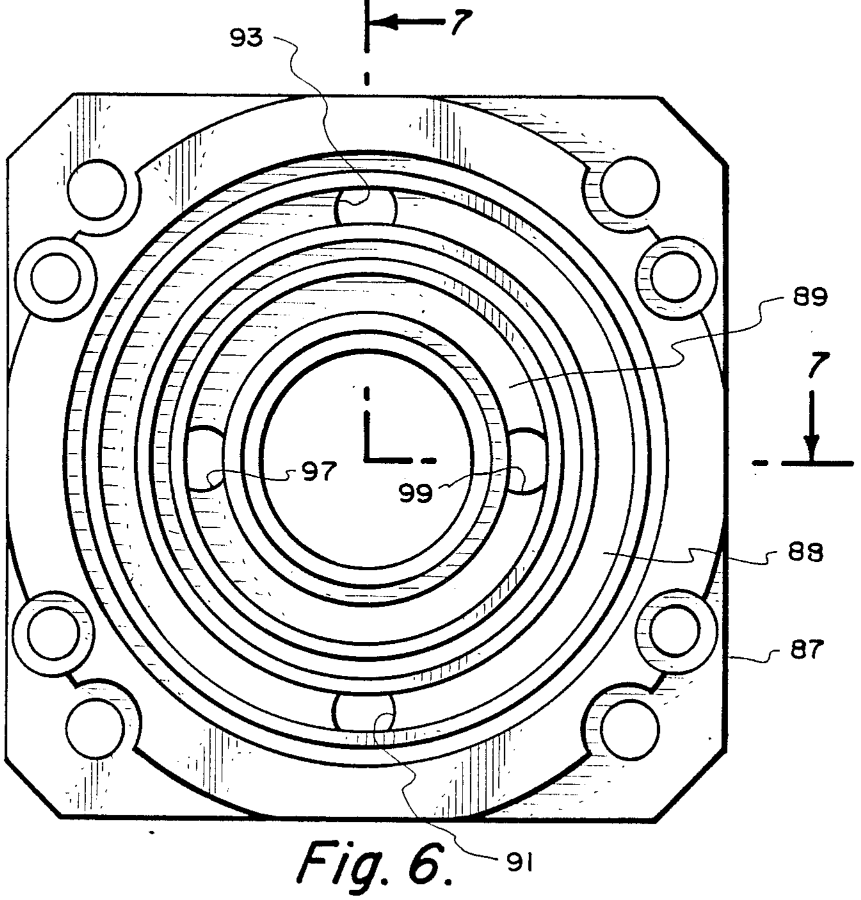
FIG. 6 is a front view of the motor interface plate of the present invention.
Figure 7:
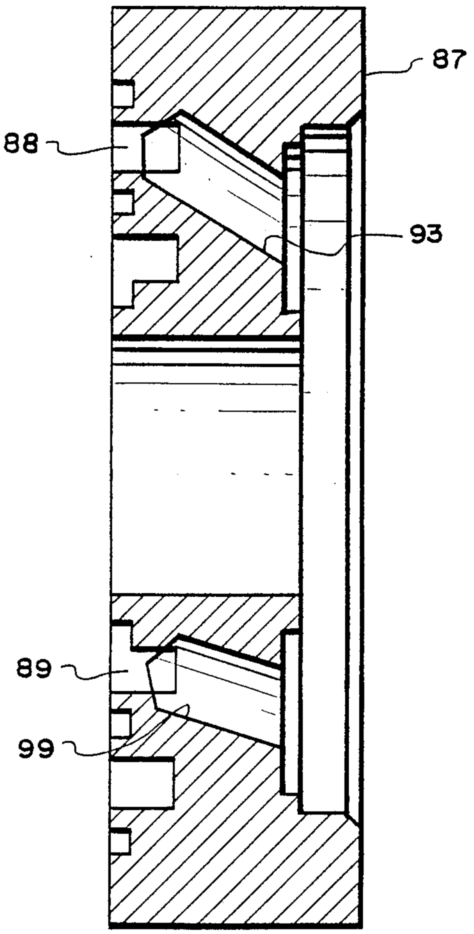
FIG. 7 is a sectional view of the motor interface plate of the present invention taken along line 8—8 of FIG. 6.

Referring now to FIG. 5 reversing valve 67 which is journalled and rotational within a cavity 75 in housing 16 includes a forward passageway 76 connected to a forward passageway 77 within housing 16 and a reversing passageway 78 connected to a reversing passageway 79 within housing 16. Attached to one end of reversing valve 67 by a screw 80 is a valve handle 81 which when engaged by an operator will rotate valve 67 within a valve sleeve 82 which is press fitted within cavity 75 of housing 16 and which has a trio of apertures 141, 143 and 145 respectively aligned with passageways 65, 77 and 79. Rotation of valve handle 81 thereby rotating valve 67 allows pressurized seawater to flow either through passageway 76 into passageway 77 or passageway 78 (as illustrated in FIG. 5) into passageway 79. There is also fitted around an indent 83 within valve handle 81 a thrust washer 84 which maintains valve 67 in a centered positioned. A seal 85 fitted within an indent 86 near the opposite end of valve 67 prevents pressurized seawater from leaking from valve 67.

Referring to FIGS. 2, 5, 6, and 7, there is shown motor interface plate 87 which is mounted between housing 16 and vane motor 17. Motor interface plate 87 has on the front thereof a pair of circular channels 88 and 89 with channel 88 being connected to forward passageway 77 and channel 89 being connected to reversing passageway 79. Motor interface plate 87 also has a first pair of passageways 91 and 93 which connect channel 88 to the two forward inlet-reverse outlet ports 95 (only one of which is illustrated in FIG. 2) of motor 17; and a second pair of passageways 97 and 99 which connect channel 89 to the reverse inlet-forward outlet ports 101 (only one of which is illustrated in FIG. 2 of motor 17. There are mounted within the front face of motor interface plate 87 three O rings 205, 207, 209, with O ring 205 being positioned outside of channel 88, O ring 207 being positioned between channel 88 and channel 89, and O ring 89 being positioned inside of channel 89. O rings 205, 207, and 209, in turn, retain pressurized seawater within channels 88 and 89 during the operation of rotary impact tool 15.

When an operator engages trigger 47 and reversing valve 67 is set in the position illustrated in FIG. 5, pressurized seawater flows from valve 41, through passageway 65, passageway 78 of reversing valve 67, passageway 79 of housing 16, channel 89 and passageways 97 and 99 of motor interface plate 87 into ports 101 of vane motor 17 thereby driving motor 17 in a reverse direction. Pressurized seawater then exits vane motor 17 through ports 95, passageways 91 and 93 and channel 88 of motor interface plate 87, passageways 77 and 76 into an exhaust port 103, illustrated in phantom in FIG. 2.

By rotating reversing valve 67 pressurized seawater will flow from passageway 65 through passageway 76 and 77, channel 87, passageways 91 and 93 into ports 95 driving vane motor 17 in a forward direction. Pressurized then exists ports 101 of vane motor 17 and flows through passageways 97 and 99, channel 89, and passageways 79 and 78 into passageway 103 where the pressurized seawater is exhausted from rotary impact tool 15.

At this time, it should be noted that in the preferred embodiment of the present invention valve 67 was fabricated from stainless steel and valve sleeve 82 was fabricated from a bronze aluminum alloy to prevent premature wear of these critical components of rotary impact tool 15 and to resist the corrosive effects of seawater. It should also be noted that frame 15 has a pair of cavities 104 (as is best illustrated in FIGS. 1 and 5) located near the rear end thereof to reduce the weight of rotary impact tool 15 and to allow ambient seawater to pass through housing 16 and to exhaust around the shaft 105 of vane motor 17.

Figure 8:
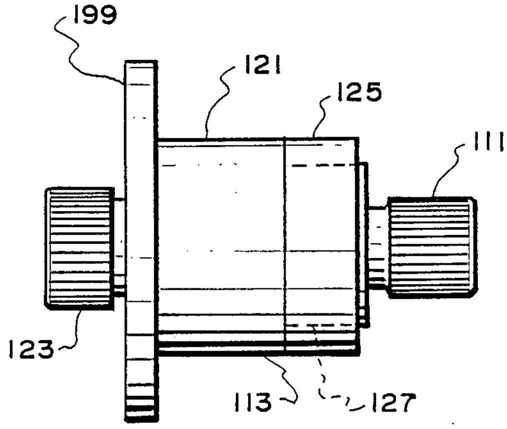
FIG. 8 is a view illustrating the coupling assembly of the present invention.
Figure 10:
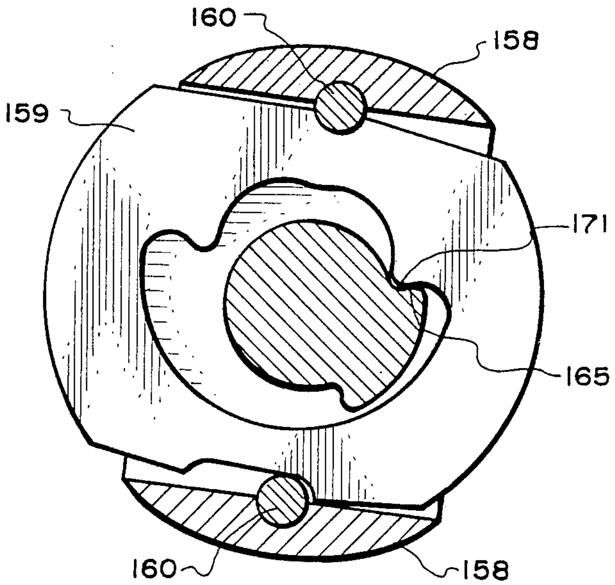
FIG. 10 is a sectional view of the twin hammer impact mechanism used with the present invention.

Referring now to FIGS. 2 and 8 seawater powered vane motor 17 has shaft 105 journalled in housing 16. Shaft 105, in turn, has a spherical shaped spline 107 (illustrated in phantom) at its end. The spherical shaped spline 107 of shaft 105 is connected by a motor shaft sleeve 109 to a first spline 111 (illustrated in phantom) at one end of a coupling assembly 113. The spherical shaped spline 107 of shaft 105 compensates for possible non-alignment of motor shaft 105 with respect to spline 111 when vane motor 17 is mounted on motor plate 87 thereby preventing axial or lateral loads from being transferred to shaft 105 when rotary impact tool 15 is operational.

Coupling assembly 113 is positioned within a movable rear plate 115 located in a cavity 116 near the rear end of housing 16 and forming an integral part of housing 16. Coupling assembly 113 is, in turn, rotatably supported within rear plate 115 by a bushing 117. Coupling assembly 113 includes a coupling 121 which has spline 111 at one end, a second spline 123 at the opposite end and a coupling sleeve 125 press fitted about the periphery of the minor diameter region 127 thereof. There is located between sleeve 125 and rear plate 115 a water tight seal 129, while a pair of water tight O rings 131 and 133 are fitted respectively within a pair of indents 135 and 137 located within an enlarged region 139 at the front of movable rear plate 115.

It should be noted that coupling 121 was fabricated from a bronze aluminum alloy and that coupling sleeve 125 was fabricated from stainless steel to prevent premature wear of coupling 121 from seal 129.

Referring now to FIGS. 2, 8, 9 and 10, there is shown a twin hammer impact mechanism 151 rotatably positioned within a cavity 153 at the front portion of housing 16. Twin hammer impact mechanism 151 includes a hammer frame or cage 155, an internal spline 156, illustrated in phantom, adapted to engage the external spline 123 of coupling 121, a pair of identically shaped balanced twin hammers 157 and 159 spaced longitudinally in frame 155 and pivoted on tilting axes spaced diametrically from each other, and an anvil 161. The anvil 161 carries a pair of anvil jaws 163 and 165 located longitudinally and diametrically from each other, while each hammer 157 and 159 pivots respectively on hammer pins 167 and 169 providing tilting axis, with each hammer pin being fitted in a longitudinal interchannel 160 extending the length of a strut 158.

Activation of vane motor 17 rotates hammer frame 155 thereby rotating hammers 157 and 159 which also swing with respect to hammer frame 155. Each hammer 157 and 159, in turn, has an impact delivery jaw 171, FIG. 10, with the pair of impact delivery jaws 171 being positioned so as to simultaneously strike the anvil jaws 163 and 165 of anvil 161 for each complete revolution of frame 155, thereby translating vane motor power into output torque.

At this time it should be noted that the twin hammer impact mechanism used in the preferred embodiment of the present invention is described in U.S. Pat. No. 3,661,217 to Spencer B. Maurer and is commercially available from and manufactured by Ingersol-Rand.

Referring now to FIG. 2 a pair of boss plugs 173 and 175 are removably mounted within a pair of apertures 177 and 179 within housing 16 and are utilized to allow an operator to fill cavity 153 with a water soluble oil to provide lubrication and cooling for twin hammer impact mechanism 151. The water soluble oil used in the preferred embodiment of the present invention is a Century number 101 high water based oil manufactured by Century Oils Limited, United Kingdom, Hanely, Stoke-On-Trent.

Figure 9:
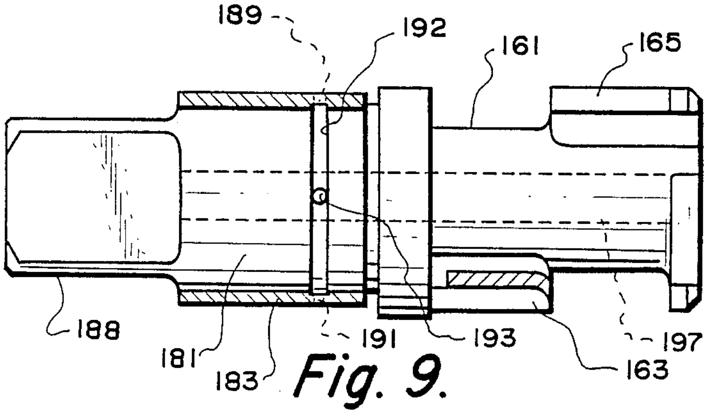
FIG. 9 is a side view of the anvil of the twin hammer impact mechanism used with present invention.

Referring now to FIGS. 2 and 9, anvil 161 includes an integral forwardly extending tubular portion 181 having an anvil sleeve 183 press fitted thereon with anvil sleeve 183 being rotatably mounted in a bushing 185 mounted within the nose 186 of frame 15. Positioned between the nose 186 of frame 15 and sleeve 183 at the front end thereof is a seal 187 which prevents lubricant from escaping from rotary impact tool 15. Anvil 161 has at the forward end thereof a square tool engaging element 188 adapted to engage a socket (not shown) having a square hole.

Anvil sleeve 183 has a pair of apertures 189 and 191 which respectively align with a channel 192 in anvil 161. Channel 192 is connected to a pair of apertures 193, within anvil 161 which, in turn, are connected to a bore 197, illustrated in phantom, within anvil 161. This arrangement allows for the efficient flow of oil to lubricate bushing 185 during the operation of rotary impact tool 15.

Referring now to FIGS. 2 and 8, ambient seawater enters cavity 116 through cavities 104, FIG. 1, forcing rear plate 115 in a forward direction within housing 16 as a diver descends into the ocean with rotary impact tool 15. As greater pressure is exerted on rear plate 115, rear plate 115 will move forward within housing 16 until bushing 117 abuts the flange 199 of coupling 113. As a diver ascends with rotary impact tool 15, the oil within cavity 153 will exert a force on rear plate 115 moving rear plate 115 in a rearward direction within housing 16 until a pressure balance is achieved. This movement of rear plate 115, in turn, provides for a constant pressure balance between the oil within cavity 153 and the ambient pressure within cavity 116 whether exerted by seawater or by the atmosphere with the pressure balance insuring that oil will not leak from cavity 153 and that pressurized seawater will not enter cavity 153.

Figure 11:
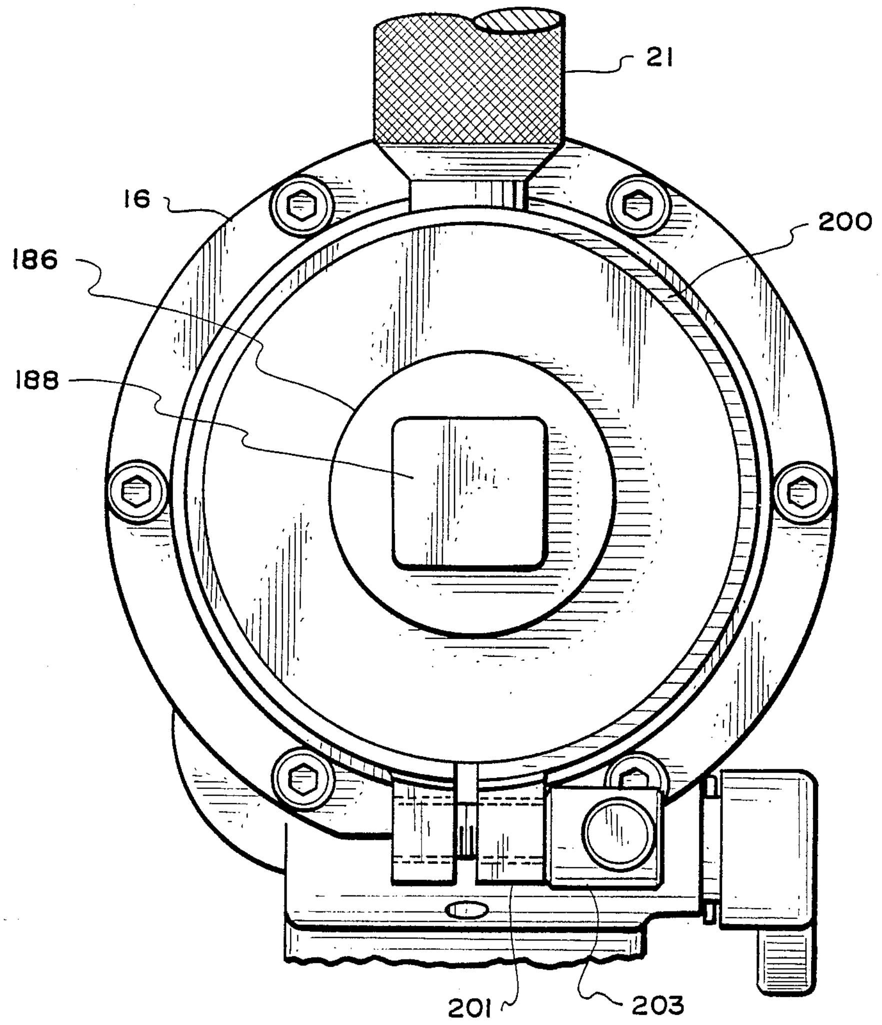
FIG. 11 is a front view of the handle strap which secures the auxiliary handle to the present invention.
Figure 12:
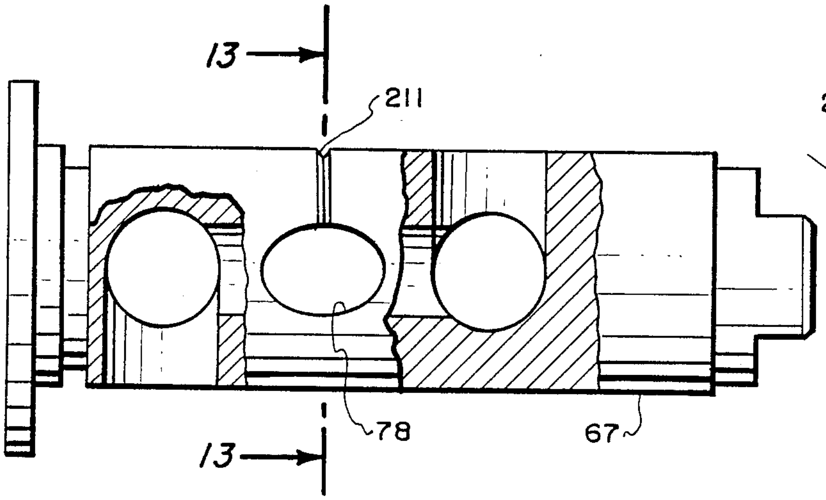
FIG. 12 is an elongated view of the reversing valve of the present invention.
Figure 13:
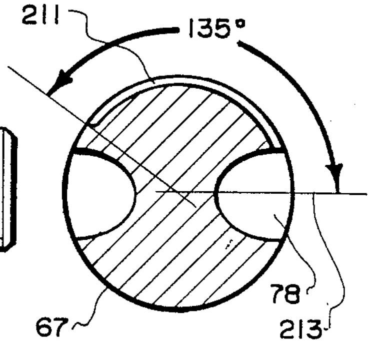
FIG. 13 is a sectional view of the reversing valve of the present invention taken along line 14—14 of FIG. 13.

Referring now to FIG. 11, there is shown a handle strap 200 which secures auxiliary handle 21 to frame 15 and allow for the positioning thereof so that either a right or left handed diver may use rotary impact tool 15. Handle strap 200 has at the ends thereof an adjustment handle block 201 and a clamp fastener 203 in threadable engagement with block 201 so as to loosen and thereby move handle strap 200.

Referring now to FIGS. 3, 5, 12 and 13, there is shown a V shaped groove 211 located about the periphery of reversing valve 67. V shaped groove 211 connects to reversing passageway 78 and extends to an angle of approximately 135 degrees with respect to the center line 213 of passageway 78. V shaped groove 211 provides a means for relieving pressure build up within passageway 65 should pressurized seawater leak through valve 41 when rotary impact tool 15 is not operational which, in turn, allows for the easy rotation of reversing valve 67.

From the foregoing, it may readily be seen that the present invention comprises a new, unique, and exceedingly useful rotary impact tool which constitutes a considerable improvement over the known prior art. Obviously, many modifications and variations of the present invention are possible in light of the above teachings. It is therefore to be understood that within the scope of the appended claims the invention may practiced than as specifically described.

What is claimed is:

1. A rotary impact tool which uses pressurized seawater as the operating fluid comprising:

a housing;

a seawater powered vane motor mounted on said housing, said seawater powered vane motor having a shaft journalled within said housing and rotated by seawater under pressure, and at least one forward inlet-reverse outlet port and at least one reverse inlet-forward outlet port;

control means having a trigger, the trigger of said control means when engaged allowing pressurized seawater to pass through said control means to said seawater powered vane motor so as to rotate the shaft of said vane motor;

means for directing pressurized seawater to the forward inlet-reverse outlet port of said seawater powered vane motor such that when said trigger is engaged the shaft of said motor rotates in a forward direction or to the reverse inlet-forward outlet port of said seawater powered vane motor such that when said trigger is engaged the shaft of said motor will rotate in a reverse direction;

a rotary impact mechanism mounted in the front portion of said housing and having a tool engaging element protruding from said housing; and means mounted within said housing for coupling the shaft of said seawater powered vane motor to said impact mechanism so as to transmit the rotating motion of the shaft of said motor to said impact mechanism.

2. The rotary impact tool of claim 1 wherein said directing means comprises a valve rotatably mounted within said housing, said valve having a pair of passageways, the first passageway of which connects said control means to the forward inlet-reverse outlet port of said motor and the second passageway of which connects said control means to the reverse inlet-forward outlet port of said motor and a V shaped groove located about the periphery thereof and connected to said second passageway.

3. The rotary impact tool of claim 1 wherein said coupling means comprises:

a coupling having a first spline at the rear end thereof, a second spline at the front end thereof and a minor diameter portion near the rear thereof;

a motor sleeve connecting the shaft of said motor to said first spline;

a coupling sleeve press fitted about the minor diameter portion of said coupling; and a bushing mounted within said housing, said bushing being adapted to rotatably support said coupling.

4. The rotary impact tool of claim 1 wherein the shaft of said motor has a spherical shaped spline at the end thereof so as to compensate for non-alignment of the shaft of said motor with respect to said coupling means.

5. The rotary impact tool of claim 1 wherein said rotary impact mechanism comprises:

a hammer frame rotatably mounted within said housing and having a spline in engagement with said coupling means;

a pair of identically shaped balanced hammers carried within said frame, spaced longitudinally in said frame and pivoting on tilting axis spaced diametrically from each other, each of said hammers having an impact delivery jaw;

a pair of hammer pins, each of said pins being fitted in a longitudinal internal channel extending the length of a strut of said frame and each of said hammers pivoting on one of said hammer pins;

an anvil having said tool engaging element at one end thereof and a pair of jaws located longitudinally and diametrically from each other;

said delivery impact jaws simultaneously striking the jaws of the jaw of said anvil once during each revolution of said frame.

6. The rotary impact tool of claim 1 further characterized by an auxiliary handle having a handle strap adapted to secure said auxiliary handle to said housing, said handle strap having at the ends thereof an adjustment handle block and a clamp fastener in threadable engagement with said adjustment handle block.

7. The rotary impact tool of claim 1 further characterized by a pair of cavities located near the rear of said housing and a rear plate movable within said housing, said rear plate moving in a forward direction in said housing as ambient seawater enters said housing through said cavities and a reverse direction in said housing as ambient seawater exits from said housing through said cavities.

8. A rotary impact tool which uses pressurized seawater as the operating fluid comprising:

a housing;

a seawater powered vane motor mounted on said housing, said seawater powered vane motor having a shaft journalled within said housing and rotated by seawater under pressure, and at least one forward inlet-reverse outlet port and at least one reverse inlet-forward outlet port;

control means having a trigger, the trigger of said control means when engaged allowing pressurized seawater to pass through said control means to said seawater powered vane motor so as to rotate the shaft of said vane motor;

valve means rotatably mounted within said housing, said valve means having a pair of passageways, the first passageway of which connects said control means to the forward inlet-reverse outlet port of said seawater powered vane motor such that when said trigger is engaged the shaft of said motor rotates in a forward direction and the second passageway of which connects said control means to the reverse inlet-forward outlet port of said seawater powered vane motor such that when said trigger is engaged the shaft of said motor will rotate in a reverse direction, said valve means being rotatably mounted within said housing so as to allow for the connection of said control means to either the forward inlet-reverse outlet port of said motor or the reverse inlet-forward outlet port of said motor;

a rotary impact mechanism mounted in the front portion of said housing and having a tool engaging element protruding from said housing; and means mounted within said housing for coupling the shaft of said seawater powered vane motor to said impact mechanism so as to transmit the rotating motion of the shaft of said motor to said impact mechanism.

9. The rotary impact tool of claim 8 wherein said control means comprises:

a control handle assembly attached to said housing and having a cavity, an inlet passageway connected to said cavity and an outlet passageway connected between said cavity and either the first passageway of said valve means or the second passageway of said valve means;

a valve having a valve seat mounted within the cavity of said control handle assembly, a stem slidingly fitted within the cavity of said control handle assembly, and a spring;

said valve stem having a trigger pin at one end, an indent and a conical shaped face adjacent said indent with the spring of said valve being adapted to hold the conical shaped face of said valve stem against said valve seat; and a trigger rotatably affixed to said control handle assembly, said trigger being connected to the trigger pin of said valve stem such that engagement of said trigger releases the conical shaped face of said valve stem from said valve seat allowing pressurized seawater to flow from the inlet passageway of said control handle assembly through the indent of said valve stem and the output passageway of said control handle assembly into either the first passageway of said valve means or the second passageway of said valve means.

10. The rotary impact tool of claim 8 wherein said coupling means comprises:

a coupling having a first spline at the rear end thereof, a second spline at the front end thereof and a minor diameter portion near the rear thereof;

a motor sleeve connecting the shaft of said motor to said first spline;

a coupling sleeve press fitted about the minor diameter portion of said coupling; and a bushing mounted within said housing, said bushing being adapted to rotatably support said coupling.

11. The rotary impact tool of claim 8 wherein the shaft of said motor has a spherical shaped spline at the end thereof so as to compensate for non-alignment of the shaft of said motor with respect to said coupling means.

12. The rotary impact tool of claim 8 wherein said rotary impact mechanism comprises:

a hammer frame rotatably mounted within said housing and having a spline in engagement with said coupling means;

a pair of identically shaped balanced hammers carried within said frame, spaced longitudinally in said frame and pivoting on tilting axis spaced diametrically from each other, each of said hammers having an impact delivery jaw;

a pair of hammer pins, each of said pins being fitted in a longitudinal internal channel extending the length of a strut of said frame and each of said hammers pivoting on one of said hammer pins;

an anvil having said tool engaging element at one end thereof and a pair of jaws located longitudinally and diametrically from each other;

said delivery impact jaws simultaneously striking the jaws of the jaw of said anvil once during each revolution of said frame.

13. The rotary impact tool of claim 8 further characterized by an auxiliary handle having a handle strap adapted to secure said auxiliary handle to said housing, said handle strap having at the ends thereof an adjustment handle block and a clamp fastener in threadable engagement with said adjustment handle block.

14. The rotary impact of claim 8 further characterized by a pair of cavities located near the rear of said housing and a rear plate movable within said housing, said rear plate moving in a forward direction in said housing as ambient seawater enters said housing through said cavities and a reverse direction in said as ambient seawater exits from said housing through said cavities.

15. The rotary impact tool of claim 8 further characterized by a lifting eye attached to said housing.

16. A rotary impact tool which uses pressurized seawater as the operating fluid comprising:

a housing;

a seawater powered vane motor mounted on said housing, said seawater powered vane motor having a shaft journalled within said housing and rotated by seawater under pressure, and at least one forward inlet-reverse outlet port and at least one reverse inlet-forward outlet port;

a control handle assembly attached to said housing and having a cavity, an inlet passageway connected to said cavity and an outlet passageway;

a valve having a valve seat mounted within the cavity of said control handle assembly, a stem slidingly fitted within the cavity of said control handle assembly, and a spring;

said valve stem having a trigger pin at one end, an indent and a conical shaped face adjacent said indent with the spring of said valve being adapted to hold the conical shaped face of said valve stem against said valve seat;

a trigger rotatably affixed to said control handle assembly, said trigger being connected to the trigger pin of said valve stem such that engagement of said trigger releases the conical shaped face of said valve stem from said valve seat allowing pressurized seawater to flow from the inlet passageway of said control handle assembly through the indent of said valve stem to the output passageway of said control handle assembly;

a valve rotatably mounted within said housing, said valve having a pair of passageways, the first passageway of which connects the outlet passageway of said control handle assembly to the forward inlet-reverse outlet port of said seawater powered vane motor such that when said trigger is engaged the shaft of said motor rotates in a forward direction and the second passageway of which connects the outlet passageway of control handle assembly to the reverse inlet-forward outlet port of said seawater powered vane motor such that when said trigger is engaged the shaft of said motor will rotate in a reverse direction, said valve means being rotatably mounted within said housing so as to allow for the connection of said control means to either the forward inlet-reverse outlet port of said motor or the reverse inlet-forward outlet port of said motor;

a coupling having a first spline at the rear end thereof, a second spline at the front end thereof and a minor diameter portion near the rear thereof;

a motor sleeve connecting the shaft of said motor to said first spline;

a coupling sleeve press fitted about the minor diameter portion of said coupling;

a bushing mounted within said housing, said bushing being adapted to rotatably support said coupling;

a hammer frame rotatably mounted within said housing and having a spline in engagement with the second spline of said coupling;

a pair of identically shaped balanced hammers carried within said frame, spaced longitudinally in said frame and pivoting on tilting axis spaced diametrically from each other, each of said hammers having an impact delivery jaw;

a pair of hammer pins, each of said pins being fitted in a longitudinal internal channel extending the length of a strut of said frame and each of said hammers pivoting on one of said hammer pins;

an anvil having a pair of jaws located longitudinally and diametrically from each other and a tool engaging element at the front end thereof, said tool engaging element protruding from said housing;

said delivery impact jaws simultaneously striking the jaws of the jaw of said anvil once during each revolution of said frame.

17. The rotary impact tool of claim 16 wherein the shaft of said motor has a spherical shaped spline at the end thereof so as to compensate for non-alignment of the shaft of said motor with respect to said coupling.

18. The rotary impact tool of claim 16 further characterized by an auxiliary handle having a handle strap adapted to secure said auxiliary handle to said housing, said handle strap having at the ends thereof an adjustment handle block and a clamp fastener in threadable engagement with said adjustment handle block.

19. The rotary impact mechanism of claim 16 further characterized by a V shaped groove located about the periphery of said valve, said V shaped groove being connected to the second passageway of said valve.

20. The rotary impact tool of claim 16 further characterized by a pair of cavities located near the rear of said housing and a rear plate movable within said housing, said rear plate moving in a forward direction in said housing as ambient seawater enters said housing through said cavities and a reverse direction in said housing as ambient seawater exits from said housing through said cavities.

* * * * *